(12) United States Patent
Ginzburg et al.

(10) Patent No.: US 7,502,383 B2
(45) Date of Patent: Mar. 10, 2009

(54) APPARATUS AND METHOD OF CONTROLLING TRANSMISSION OF RESPONSE FRAME

(75) Inventors: Boris Ginzburg, Haifa (IL); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 11/046,825

(22) Filed: Feb. 1, 2005

(65) Prior Publication Data

US 2006/0187951 A1  Aug. 24, 2006

(51) Int. Cl.
*H04L 12/413* (2006.01)
*H04J 15/00* (2006.01)

(52) U.S. Cl. .............. 370/448; 370/432; 370/445; 370/447; 370/465; 370/468

(58) Field of Classification Search .......... 370/445, 370/447, 448, 432, 431, 464, 465, 468
See application file for complete search history.

(56) References Cited

U.S. PATENT DOCUMENTS

| | | | | |
|---|---|---|---|---|
| 6,937,591 | B2 * | 8/2005 | Guo et al. | 370/338 |
| 7,280,554 | B2 * | 10/2007 | Moutarlier | 370/445 |
| 2004/0264429 | A1 * | 12/2004 | Tatara | 370/338 |
| 2005/0025176 | A1 * | 2/2005 | Ko et al. | 370/448 |
| 2005/0147056 | A1 * | 7/2005 | Chinitz | 370/310 |
| 2005/0276276 | A1 * | 12/2005 | Davis | 370/447 |
| 2006/0034199 | A1 * | 2/2006 | Chu et al. | 370/310 |
| 2006/0146705 | A1 * | 7/2006 | Waxman | 370/230 |
| 2007/0019591 | A1 * | 1/2007 | Chou et al. | 370/337 |

FOREIGN PATENT DOCUMENTS

EP  1 351 437  10/2003

OTHER PUBLICATIONS

Pang, Ai-Chun and Tseng, Hsueh-Wen, "Dynamic Backoff for Wireless Personal Networks", IEEE Communications Society, Globecom 2004.*
Deng, Jing et al., "A new backoff alogrithm for the IEEE 802.11 Distributed Coordination Function", Proceedings of Communication Networks and DIstributed Systems Modeling and Simulation, Jan. 18-21, 2004.*
LAN MAN Standards Committee of the IEEE Computer Society, Part 11: Wireless LAN Medium Access Control (MAC) and Physical Layer (PHY) Specifications, IEEE-SA Standards Board, ANSI/IEEE Std 802.11, 1999 Edition (R2003), pp. 39-42, 72-77.*

(Continued)

*Primary Examiner*—Daniel J Ryman
*Assistant Examiner*—Cassandra Decker
(74) *Attorney, Agent, or Firm*—Pearl Cohen Zedek Latzer, LLP

(57) ABSTRACT

Briefly, a method and apparatus to able to set a back-off slot time value and a contention window back-off slots number of a channel access mechanism to control transmissions of two or more response frames from two or more Responders in respond to receiving a data unit of an aggregated data stream that includes a plurality of data units addressed to the two or more Responders.

15 Claims, 2 Drawing Sheets

OTHER PUBLICATIONS

TGn Sync Proposal Technical Specification Doc: IEEE 802.11-04/0889r2, pp. 1-17 and 61-65.

Lott M. et al., "Point-to-multipoint ARQ Protocol with Efficient Acknowledgement Transmission", VTC 2001 Spring, IEEE VTS 53rd Vehicular Technology Conference, Rhodes, Greece, May 6-9, 2001, IEEE Vehicular Technology Conference, New York, NY, IEEE, US, vol. 4 Conf. 53, May 6, 2001, pp. 3064-3068.

Weinmiller J. et al., "Analyzing and Improving the IEEE 802.11-MAC protocol for Wireless LANs", Modeling, Analysis and Simulation of Computer and Telecommunication Systems, 1996, Mascots 96', Proceedings of the 4th Internaional Workshop on San Jose, CA, USA, Feb. 1-3, 1996, Los Alamitos, CA, USA, IEEE Comput. Soc. US Feb. 1, 1996, pp. 200-206.

International Search Report for PCT/US2006/003447, mailed on May 8, 2006.

* cited by examiner

APPARATUS AND METHOD OF CONTROLLING TRANSMISSION OF RESPONSE FRAME

BACKGROUND OF THE INVENTION

A wireless local area network (WLAN) may include a basic service set (BSS). The BSS may include an access point (AP) and one or more stations (STA). The AP may transmit frames to the one or more stations. The sequence of frames that may be used to transmit data from one station to one or more other stations, and to receive a response(s) from the one or more stations, may be referred to as a transmit sequence. The transmit sequence may include an aggregated data stream, which contains data frames addressed to multiple receive addresses, and one or more response frames from the stations responding to transmission of the aggregated data stream.

For example, the AP may transmit an aggregated data stream that includes a plurality of data units transmitted via single media access without inter frame spacing. The aggregated data stream may include data units for different receiving stations with different receive addresses. A station (e.g. the AP) that sends frames to a number of other stations may be referred to herein as initiator and the other stations may be referred to as Responders.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
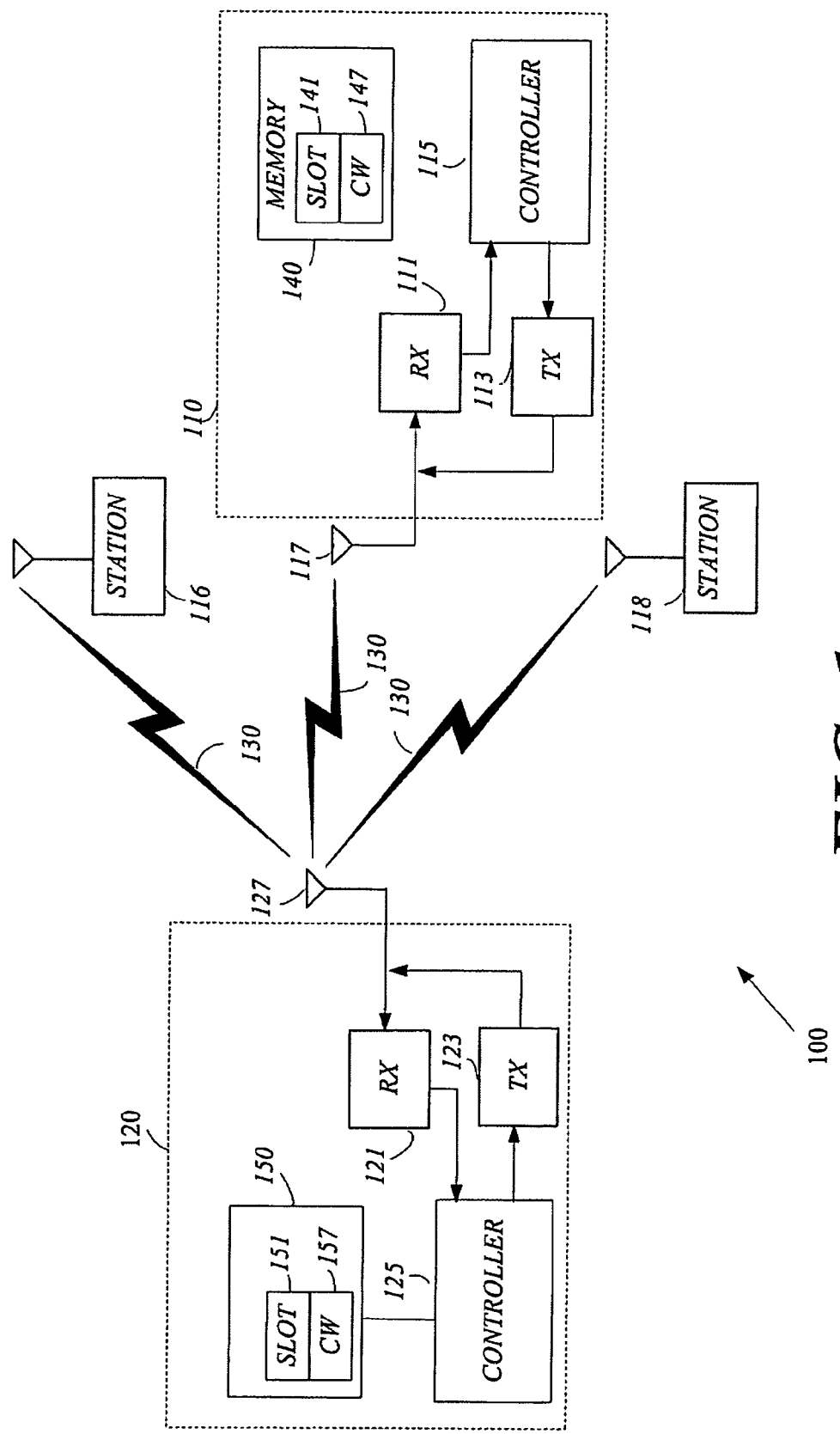
FIG. 1 is a schematic illustration of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, or transmission devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, two-way radio stations, digital system stations, analog system stations, cellular radiotelephone stations, and the like.

Types of WLAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a wireless communication system 100, for example, a WLAN, according to embodiments of the present invention, is shown. Although the scope of the present invention is not limited in this respect, the exemplary WLAN 100 may be defined, e.g., by IEEE 802.11-1999 standard, as a BSS. For example, the BSS may include at least one communication station, for example, stations 110, 116 and 118 and an access point (AP) 120, if desired.

According to some embodiments of the present invention, stations 110, 116 and 118 and/or AP 120 may transmit an aggregated data stream that may include a plurality of data units, which may be addressed to multiple stations. The station (e.g. station 110) and/or the AP (e.g. AP 120) that transmits the aggregated data stream may be referred to herein as an Initiator and the one or more stations and/or APs that respond to the transmission of the aggregated data stream may be referred to herein as Responders. According to this exemplary embodiment of the invention, AP 120 will be described as the Initiator and stations 110, 116 and 118 will be described as Responders, although the scope of the present invention is in no way limited in this respect.

In this exemplary embodiment of the invention, station 110 may include a receiver (RX) 111, a transmitter (TX) 113, a controller 115, a memory 140 and antenna 117 and AP 120 may include a receiver (RX) 121, a transmitter (TX) 123, a controller 125, a memory 150 and an antenna 127.

Although the scope of the present invention is not limited in this respect, one or both of antennas 117 and 127 may be an omni-directional antenna, a monopole antenna, a dipole antenna, an end fed antenna, a circularly polarized antenna, a micro-strip antenna, a diversity antenna, an antenna array, an internal antenna or the like. It should be understood that in some embodiments of the present invention, station 110 and AP 120 may include two or more antennas.

Although the scope of the present invention is not limited in this respect, the Initiator (e.g. AP 120) may transmit to Responders (e.g. stations 110, 116 and 118) during a transmit sequence time period, for example, a transmit opportunity (TxOP) time period as defined by IEEE 802.11e D13.00-2005 Draft standard, an aggregated data stream that includes one or more data units and a block acknowledge request (BAR) attached to one or more data units that may be addressed to one of the Responders. Responders (e.g. stations 110, 116 and 118) may respond by sending a response frame, e.g., an acknowledge (ACK) frame, to the Initiator during the transmit sequence.

For example, the Responder, e.g. station 110, may operate as follows: RX 111 may receive one or more data units and the BAR via antenna 117. Controller 115 may control an access to a wireless medium according to a contention-based access mechanism; for example, controller 115 may control transmissions of the response frame to the Initiator, if desired. The contention-based access mechanism may operate according to distributed coordination function (DCF) rules to return acknowledge frames (ACKs) and/or response frames to the Initiator, if desired. For example, the DCF rules to return ACKs may include one or more of the following rules:

1. A back-off time countdown may start, for example, a short inter frame space (SIFS) after the transmission of the aggregated data stream may end.
2. Set a predetermined time to a back-off slot of a contention window (CW), for example, 4 microseconds.
3. A minimum value of a contention window (e.g., OW_min) may be optimized according to the probability of collisions during the transmit sequence depending on a number of Responders to the aggregated data stream.
4. The values of the slot and CW_min may be set at the start of the current transmit sequence by the Initiator and may not be changed until the end of the current transmit sequence.

It should be understood that the above rules are given only as an example to demonstrate possible DCF rules. Other rules may additionally or alternatively be used in accordance with different embodiments of the invention.

Although the scope of the present invention is not limited in this respect, a contention window (CW) may include a predetermined number of back-off slots. The number of back-off slots may be a binary polynomial function, for example, a power of two minus one, e.g., 31, 63, 127 or the like. Controller 115 may set a back-off slot time value and a CW back-off slots number of the channel access mechanism to control transmissions of a response frame (e.g. ACK). Memory 140 may store a predetermined back-off slot time value 141 and a predetermined CW back-off slots number 147, wherein controller 115 may be capable of setting the back-off slot time value and the CW back-off slots number according to predetermined back-off slot time value 141 and the predetermined CW back-off slots number 147, respectively, if desired.

According to some other embodiments of the invention, receiver 111 may be capable of receiving a beacon 130 including the back-off slot time value (e.g. back-off slot time value 141) and the CW back-off slots number (e.g. CW back-off slots number 147). Alternatively, according to other embodiments of the invention, controller 115 may be capable of uploading a predetermined back-off slot time value 141 from memory 140 and to receive the CW back-off slots number from the beacon (e.g. beacon 130) and may set the back-off slot time value and the CW back-off slots number (e.g CW_Min) according to the uploaded back-off slot time value and the CW back-off slots number received from the beacon, respectively. Transmitter 113 may transmit a response frame within the transmit sequence time period, e.g. during a TxOP time slot, according to the DCF rules. The response frame may include the back-off slot time value and the CW back-off slots number, if desired.

Although the scope of the invention is not limited in this respect, it should be understood that when AP 120 acts as a Responder the operation of RX 121, TX 123, controller 125 and memory 150 may be similar to the operation of RX 111, TX 113, controller 115 and memory 140 of station 110 as described above. In addition, it should be understood that the operation of the contention-based access mechanism may be implemented by hardware and/or by software and/or by any combination of hardware and software.

Although the scope of the present invention is not limited in this respect the Initiator, e.g. AP 120 may operate as follows: Controller 125 may control access to a wireless medium according to a contention-based access mechanism, for example, access of transmissions of aggregated data streams to station 110, if desired. The aggregated data stream may include one or more data units wherein the data units may include one or more parameter values set by AP 120, if desired. For example the parameter values may include a back-off slot time value 151, a CW back-off slots number 157 and the like. Back-off slot time value 151 and CW back-off slots number 157 may be stored in memory 150, if desired.

According to some embodiments of the invention, transmitter 123 may transmit the aggregated data stream to Responders via antenna 127 and receiver 121 may receive the response frames from Responders (e.g. station 110). Controller 125 may retransmit an aggregated data stream that include one or more BARs of the Responders that unsuccessfully transmitted the response frames, although the scope of the present invention is not limited to this example.

Figure 2:
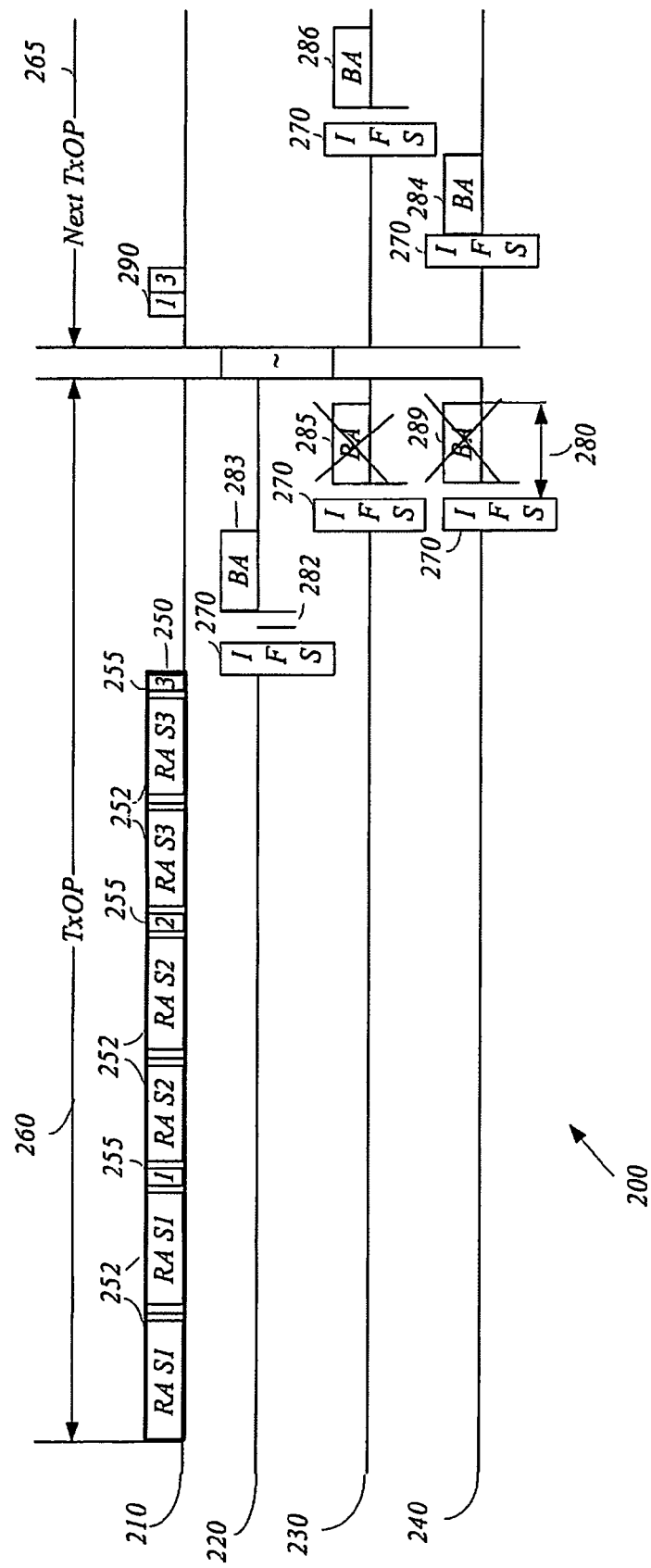
FIG. 2 is a schematic timing diagram of a transmission sequence for transmitting an aggregated data stream to multiple receivers according to some exemplary embodiments of the present invention.

Turning to FIG. 2, a timing diagram 200 of a transmission sequence for transmitting an aggregated data stream 250 to multiple receivers according to some exemplary embodiments of the present invention is shown. Although the scope of the present invention is not limited in this respect, timing diagram 200 illustrates an exemplary timing scheme of an Initiator 210, an exemplary timing scheme of a first Responder 220, an exemplary timing scheme of a second Responder 230, and an exemplary timing scheme of a third Responder 240. The Initiator, for example AP 120, may transmit aggregated data stream 250 within a transmit sequence time period, for example, a TxOP 260, and the Responders may respond by transmitting response frames, for example, block acknowledge (BA) frames 270, within TxOP 260, if desired.

According to this exemplary embodiment of the invention, aggregated data stream 250 may include six data units 252 and three block acknowledge request (BAR) 255 units attached to the data units that may be addressed to desired Responders. BARs 255 are marked as 1, 2 and 3, wherein the BAR marked 1 may be the BAR of the first Responder (e.g. station 110), the BAR marked 2 may be the BAR of the second Responder (e.g. station 116) and the BAR marked 3 may be the BAR of the third Responder (e.g. station 118). In addition data units 252 may include a receiver address (RA) of the Responder, although the scope of the present invention is not limited to this example.

According to exemplary embodiments of the invention, the Responders may randomly set a back-off time period to respond after inter frame slot (IFS) time 270. For example, a contention window (CW) 280 may include slots 282. In this exemplary embodiment the first Responder 220 may transmit a response frame, for example, a block acknowledge (BA) 283, after two back-off time slots, the second Responder 230 may transmit BA 285 after three back-off time slots, and the third Responder 240 may transmit BA 289 after three back-off time slots. This may cause BA 287 and BA 289 to collide, although the scope of the present invention is not limited to this example.

Although the scope of the present invention is not limited in this respect, in a next transmit sequence, for example a TxOP 265, the Initiator may retransmit an aggregated data stream 290 that may include BARs for the second Responder and for the third responder, if desired. In some other embodiments of the invention, aggregated data stream 290 may include also data units addressed to the second and third responders and/or other data units for other Responders, if desired. According to this exemplary embodiment, the third Responder may transmit BA 286 immediately after IFS 270 and the second Responder may transmit BA 284 after one back-off time slot to avoid a collision with BA 286, although the scope of the present invention is not limited to this example.

Although the scope of the present invention is not limited in this respect, the transmit sequence (TxS), for example, TxOP 265, may be depicted as follows: TxS=AF+(IFS+CW_Min)*$N_{Responder}$, wherein AF may be the aggregated data stream length and $N_{Responder}$ may be the number of Responders. According to this equation, the value of CW_Min may be set according to the probability of collision between the response frames. In some embodiments of the invention, the value of CW_Min may determine the value of a backoff time slot, for example, backoff slot time ≧4 microseconds, and the number of backoff slots ($N_{back\_off\_slot}$) according to the equation CW_Min=backoff slot time*$N_{back\_off\_slot}$, although the scope of the invention is not limited to this example.

According to embodiments of the invention, the CW time (e.g. CW_Min) may be set according to the probability of collisions between response frames of the Responders. Thus the back-off time slot value and the back-off slots number may be set according to the probability of collisions, although the scope of the invention is not limited in this respect.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
   transmitting an aggregated data stream that includes two or more data units addressed to a first Responder and a second Responder; and
   controlling transmission of two or more response frames from the first and second Responders sent in response to the first and second Responders, receiving one or more of said data units by setting a back-off slot time value and a contention window back-off slots number of a channel access mechanism, wherein setting the back-off slot time value and the contention window back-off slots number comprises receiving at the first and second Responders a beacon including the back-off slot time value and the contention window back-off slots number.

2. The method of claim 1, wherein controlling comprises:
   controlling the transmissions of the two or more response frames within a transmit sequence.

3. The method of claim 1 comprising:
   estimating a probability of collision between two or more of said two or more response frames; and
   setting a contention window time according to the probability of collision.

4. The method of claim 3, wherein setting the contention window time comprises:
   setting a back-off slot time value and a contention window back-off slots number according to a probability of collision and the back-off slot time value and the predetermined contention window back-off slots number.

5. An apparatus comprising:
   a receiver to receive a beacon including a back-off slot time value and a contention window back-off slots number for a channel access mechanism, the channel access mechanism utilized to control transmissions of two or more response frames sent from two or more Responders in response to receiving a data unit of an aggregated data stream; and
   a controller to set, based on the back-off slot time value and the contention window back-off slots number of the beacon, a back-off slot time value and a contention window back-off slot number for one of the two or more Responders.

6. The apparatus of claim 5, wherein:
   the aggregated data stream includes two or more data units addressed to the two or more Responders and two or more block acknowledge requests from the two or more Responders, respectively.

7. The apparatus of claim 5, wherein the controller is to set the back-off slot time value and the contention window back-off slot number according to a probability of collision.

8. The apparatus of claim 5, further comprising:
   a transmitter.

9. A wireless communication system comprising:
   an Initiator having a controller to set a back-off slot time value and a contention window back-off slot number of a channel access mechanism utilized to control transmissions of two or more response frames from two or more responders in response to receiving a data unit of an aggregated data stream, wherein the controller is to upload a predetermined back-off slot time value from a memory and the contention window back-off slots number from a beacon and to set the back-off slot time value and the contention window back-off slots number according to a contention window time.

10. The wireless communication system of claim 9, wherein the Initiator comprises:
    a transmitter to transmit the aggregated data stream including two or more data units addressed to the two or more Responders and two or more block acknowledge requests from the two or more Responders, respectively.

11. The wireless communication system of claim 9, wherein the Initiator comprises:
    a memory to store a predetermined back-off slot time value and a predetermined contention window back-off slots number, wherein the controller is to set the back-off slot time value and the contention window back-off slots number according to a probability of collision.

12. A communication device comprising:
    a dipole antenna to transmit an aggregated data stream; and
    a receiver to receive a beacon including a back-off slot time value and a contention window back-off slots number for a channel access mechanism, the channel access mechanism utilized to control transmissions of two or more response frames sent from two or more Responders in response to receiving a data unit of an aggregated data stream; and
    a controller to set, based on the back-off slot time value and the contention window back-off slots number of the beacon, a back-off slot time value and a contention window back-off slot number for one of the two or more Responders.

13. The communication device of claim 12, wherein:
    the aggregated data stream includes two or more data units addressed to the two or more Responders and two or more block acknowledge requests from the two or more Responders, respectively.

14. The communication device of claim 12, comprising:
    a memory to store a predetermined back-off slot time value and a predetermined contention window back-off slots number, wherein the controller is to set the back-off slot time value and the contention window back-off slots number according to a probability of collision.

15. The communication device of claim 12, further comprising:
    a transmitter.

* * * * *